US008036526B2

(12) United States Patent
Bogoni et al.

(10) Patent No.: US 8,036,526 B2
(45) Date of Patent: Oct. 11, 2011

(54) METHOD AND APPARATUS FOR RESTORATION OF OPTICAL RING NETWORK OPERATING CONDITIONS AFTER A FAULT IS REPAIRED

(75) Inventors: Antonella Bogoni, Mantova (IT); Roberto Magri, Parma (IT); Riccardo Ceccatelli, Genoa (IT)

(73) Assignee: Ericsson AB, Stockholm (SE)

(*) Notice: Subject to any disclaimer, the term of this patent is extended or adjusted under 35 U.S.C. 154(b) by 856 days.

(21) Appl. No.: 11/915,567

(22) PCT Filed: May 26, 2006

(86) PCT No.: PCT/EP2006/005020
§ 371 (c)(1),
(2), (4) Date: Nov. 26, 2007

(87) PCT Pub. No.: WO2006/125658
PCT Pub. Date: Nov. 30, 2006

(65) Prior Publication Data
US 2008/0226287 A1    Sep. 18, 2008

(30) Foreign Application Priority Data
May 26, 2005    (IT) ................. MI2005A0982

(51) Int. Cl.
*H04B 10/00* (2006.01)
*H04B 10/08* (2006.01)

(52) U.S. Cl. ........... 398/1; 398/6; 398/7; 398/9; 398/17; 398/18; 398/34; 398/37; 398/59; 398/97; 398/177; 398/180

(58) Field of Classification Search .............. 398/1, 6, 398/7, 9, 11, 14, 15, 17, 18, 21, 30, 32, 34, 398/37, 59, 83, 92, 94, 97, 180, 177; 359/337
See application file for complete search history.

(56) References Cited

U.S. PATENT DOCUMENTS

| 5,943,147 A * | 8/1999 | Vanoli et al. ............ 398/27 |
|---|---|---|
| 5,969,840 A * | 10/1999 | Roberts ................. 398/32 |
| 6,504,630 B1 * | 1/2003 | Czarnocha et al. ........ 398/15 |
| 6,515,777 B1 * | 2/2003 | Arnold et al. ........... 398/97 |
| 6,687,049 B1 | 2/2004 | Sulhoff et al. |
| 6,904,438 B2 * | 6/2005 | Harris et al. ............ 1/1 |
| 2004/0037564 A1 * | 2/2004 | Halevi et al. ............ 398/94 |
| 2004/0170433 A1 * | 9/2004 | Caprino et al. ........... 398/83 |
| 2004/0208518 A1 * | 10/2004 | Bosloy et al. ........... 398/30 |
| 2004/0208531 A1 | 10/2004 | Bosloy et al. |

FOREIGN PATENT DOCUMENTS

| WO | 98/47039 | 10/1998 |
|---|---|---|
| WO | 03/073671 | 9/2003 |
| WO | WO 2005/025096 | * 3/2005 |
| WO | 2005/055476 | 6/2005 |

* cited by examiner

*Primary Examiner* — Li Liu
(74) *Attorney, Agent, or Firm* — Coats & Bennett, P.L.L.C.

(57) ABSTRACT

A method and apparatus for restoration of operating conditions of a WDM optical ring network comprising a plurality of amplifiers linked together in a ring after a break or fault has occurred in the network. The method comprises in response to repair of the break or other fault, increasing output power or/and pump power of an amplifier in the network such that the output power or/and pump power increases substantially in accordance with a ramp function.

25 Claims, 3 Drawing Sheets

METHOD AND APPARATUS FOR RESTORATION OF OPTICAL RING NETWORK OPERATING CONDITIONS AFTER A FAULT IS REPAIRED

This invention relates to a method and apparatus for restoration of operating conditions of an optical ring network comprising a plurality of optical amplifiers after a break or other fault in the optical ring network. The invention has particular, but not exclusive, application to a metropolitan ring network (that is, a network that covers distances up to several hundred kilometers) based on Dense Wavelength Division Multiplexing (DWDM) technology.

In PCT/IB2003/006413 it was proposed to recirculate Amplified Spontaneous Emission (ASE) noise around the ring and control and stabilise the amplifiers in a ring network through control of the magnitude of the ASE lasing peak. Control of the amplifiers based on the ASE lasing peak gives an automatic gain control mechanism that avoids complex and costly devices and algorithms usually required for other standard WDM ring networks based on EDFA amplification.

However, if a break or other fault occurs in the ring network, the amplifier immediately following the break point detects a full or partial loss of input optical power and all the amplifiers of the ring detect a loss or a considerable reduction in power of the ASE lasing peak because of the break in ASE recirculation in the ring. Normally, the amplifiers of a ring network work at constant power. Consequently, when a break or other fault occurs in the ring network, the total power supplied by the amplifier becomes available for the remaining channels circulating in the network and this can result in unacceptable transients on these remaining channels.

In PCT/EP2004/053042 it was proposed to avoid the onset of transients by controlling the amplifiers to changeover from a constant power mode to a constant gain mode when a break in the ring network occurs. However, it has been found that when the continuity of the ring is restored, the network does not always succeed in returning automatically to the operating conditions that were in effect before the break occurred and an intervention of the operator is often required.

In accordance with one aspect of the invention, there is provided a method for restoring operating conditions of an optical ring network comprising a plurality of amplifiers after a break or other fault in the optical ring network has occurred, the method comprising in response to repair of the break or fault, affecting an increase in the output power or/and pump power of one of the plurality of amplifiers such that the output power or/and pump power increases substantially in accordance with a ramp function, and the method further comprising use of threshold detection to identify when repair has occurred.

Increasing the output voltage of one of the amplifiers in accordance with a ramp function facilitates restoration of operating conditions of the ring network.

It will be understood that the term "restoring of operating conditions" used herein means that one or more measurable variables of the ring network are returned to a value that is substantially the same as the value of that variable before the break or other fault occurred. For example, return of the power of the ASE lasing peak to a value substantially equal to its value before the break or other fault occurred. However, other variables may not be restored, for example, different signals may be transmitted through the network before and after the break or other fault and therefore, the value of variables associated with these signals will be different before and after the break or other fault.

In accordance with a further aspect of the invention there is provided an optical ring network comprising a plurality of optical amplifiers linked together by optical fibres in a ring, monitoring means for detecting a break or other fault in the ring network and control means for controlling output power or/and pump power of one of the plurality of amplifiers such that the output power or/and pump power increases substantially in accordance with a ramp function in response to an absence of a break or other fault previously detected by the monitoring means, and wherein the monitoring means uses threshold detection to identify when repair has occurred.

In accordance with yet another aspect of the invention, there is provided a controller for controlling an amplifier of an optical ring network, comprising monitoring means for detecting a break or other fault in the ring network, control means for controlling output power or/and pump power of the amplifier such that the output power or/and pump power increases substantially in accordance with a ramp function in response to an absence of a break or other fault previously detected by the monitoring means, and wherein the monitoring means uses threshold detection to identify when repair has occurred.

An embodiment of the invention will now be described, by example only, with reference to the accompanying drawings, in which.

Figure 1:
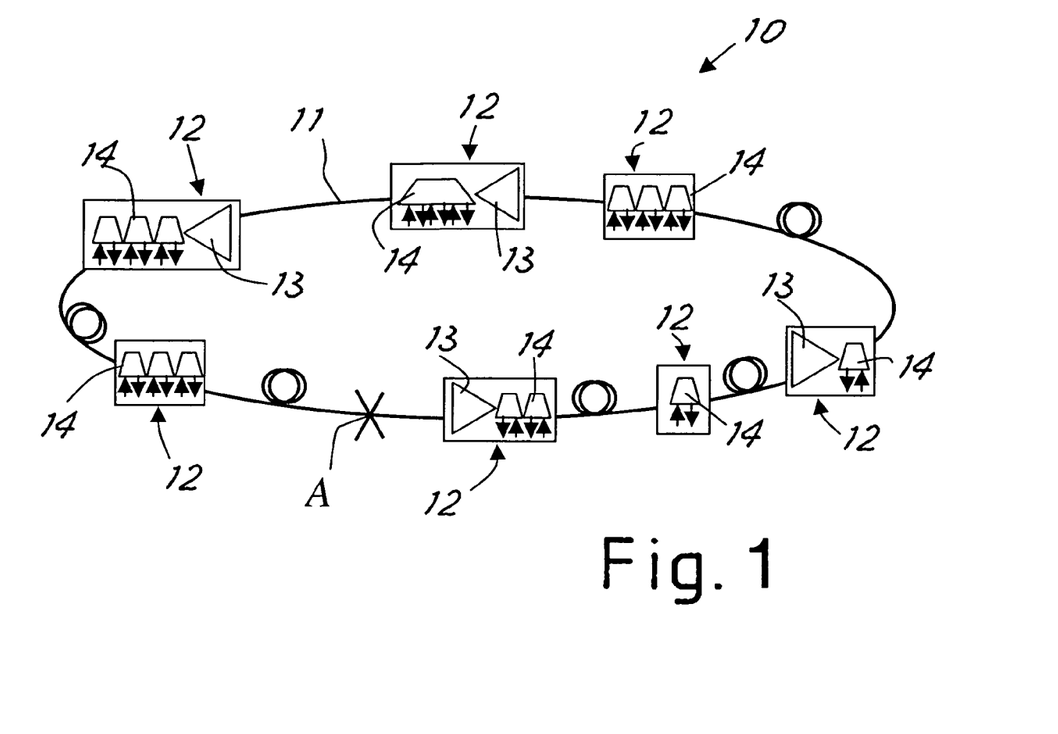
-FIG. 1 shows diagrammatically a typical optical ring network, to which the invention can be applied.

With reference to the Figures, FIG. 1 shows a typical optical ring network. This network can be used for Dense Wavelength Division Multiplexing (DWDM), although the invention is not limited to DWDM and could be used with other types of optical transmission, in particular other types of WDM.

The ring network, designated as a whole by reference number 10, comprises an optical fibre 11 along which there are nodes 12 comprising optical amplifiers 13 (for example EDFA=Erbium Doped Fibre Amplifier) and channel addition and subtraction devices 14 comprising input and/or output units through which the channels are added to and subtracted from the signal transmitted around the network 10. A similar general structure is known to those skilled in the art and therefore is not further described nor shown herein.

There can also be provided appropriate attenuators (not shown) for controlling the input signal to the amplifiers and producing established gains. This ensures a certain spectral deviation that is required for maintaining the gain effects that produce peak lasing at the ASE emission peak. Each amplifier can also include dynamic flattening filters (DGFF) not shown.

The ASE light recirculates in the ring and is used for purposes of control of the amplifiers 13 of the ring network. To this end, the amplifiers can be equipped with a monitoring means for detecting the recirculating ASE peak power (for example using an appropriate optical filter on the input side of the amplifier) together with a monitor for detecting the total input power.

Figure 2:
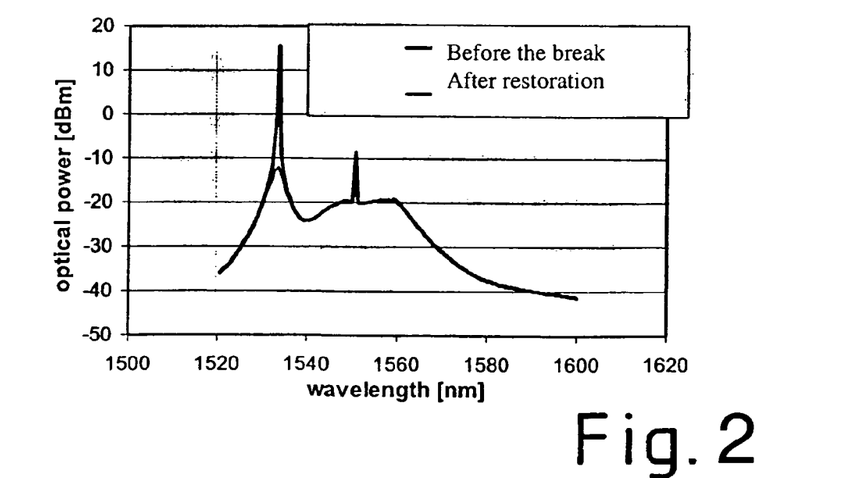
FIG. 2 shows a graph illustrating an example of an optical spectrum of a signal having a single channel at the output of an amplifier of a prior art optical ring network before a break and after restoration.

FIG. 2 shows a graph of optical power versus wavelength for the signal in a prior art ring network. In the graph, the thicker line is the transmission spectrum detected at one point in the ring (in particular, at the output of an amplifier) before a break or other fault in the network has occurred. The spectrum has two distinct peaks, that on the left, generated by the ASE emission peak of an amplifier, and that on the right, generated by the channel of the signal. The figure shows an example with a signal having a single channel.

When ASE noise circulates around the ring, it is attenuated in the fibre sections and amplified in the optical amplifiers. If the degree of amplification is sufficient, a lasing effect occurs. Adding or taking channels does not change the power level of the other channels present since the ASE lasing peak level changes to stabilize the gain.

In addition, the amplifiers can be driven in a constant power-operating mode in which the power of the signal output from the amplifier is maintained constant regardless of variations of the power of the input signal.

This can be achieved by monitoring the power output of each optical amplifier (for example with a photodiode and an appropriate feedback ring that produces an error signal for the optical amplifier pump). Alternatively, a feedforward type of control could be used. It is usual that the optical amplifiers are operated in saturation but the use of power control can generate a more accurate control of the output power.

Given that the total output power of each optical amplifier is constant, the total input of the following optical amplifier is also constant, with the exception of changes in the losses that occur on the fibre optic section connecting the two amplifiers and during the addition or removal of a channel from the signal. The addition of channels does not change the total output power but changes the relative power of the lasing signal and the channels.

One disadvantage is that the ASE lasing peak could move if the attenuation of the fibre optic section connecting two amplifiers changed or could disappear completely if the fibre were cut or a failure occurred in an optical amplifier.

For this reason the control circuitry of each optical amplifier detects the absence of the ASE peak and switches the optical amplifiers to a different operating mode when the peak disappears and/or falls below a predetermined threshold.

In particular, as clarified below, to avoid unacceptable transients on the surviving channels, when a break or an excessive lowering of the peak is detected, the amplifiers are forced to pass from the constant power-operating mode to a constant gain operating mode (the gain is set at the figure before the break).

For example, during normal operating conditions of the network 10 (that is under conditions of closed ring and steady state with ASE correctly recirculating in the ring network), the monitoring means of the circuitry of the amplifier 13 detects an ASE lasing peak having a power above a threshold. If a break of the fibre then occurs at point A in the ring, The monitoring means of the amplifier 13 detects a total loss of input power and the control circuitry causes the amplifier 13 to switch from a constant power mode to a constant gain mode.

In this way, the optical power on the surviving channels, after a brief transient, is adjusted to a correct level and these channels can continue to be correctly received among nodes of the network.

This operation causes a reduction in pump power of each amplifier in the network within upper and lower limits of the pump power levels, this reduction in pump power increasing with the number of channels lost as a result of the break. These low pump power conditions persist for the entire duration of the break.

Accordingly, after repair of the break, restoration of the network to normal operating conditions begins with all the amplifiers in the constant gain mode and with their pump powers at low level. On repair of the ring, the total power of the input signal to the first amplifier after break point A increases because of the ASE of the other amplifiers in the ring. As this first amplifier is in constant gain mode, this power increase leads to a pump power increase in the amplifier. Consequently, the output power of the first amplifier increases producing a progressive lifting of the power level of all the pumps that allows in many cases a restoration of the network to the same operating conditions as before the break.

However, it has been found through simulations and experimental tests that there are situations in which automatic restoration of the networks operating conditions is not possible. In these situations, the increase in pump power is not sufficient to re-establish the desired signal powers. Under these conditions, the channel add/drop operations can cause unacceptable transients on the other channels. In addition, after a break (or other fault), the attenuation of the signal through the network could have increased such that the network ring loss is greater than the network ring gain, thereby preventing automatic restoration of normal operation conditions on repair.

In other words, starting from the operating conditions of the amplifiers after a break or other fault has occurred and been repaired, it is not assured that for each configuration of channels the previous operating conditions can be automatically restored without a manual intervention of an operator.

FIG. 2 shows an example of the variation in power of a signal having a single channel that may occur when automatic restoration of the operating conditions of the network is not achieved. The power spectrum is taken at the amplifier output preceding the break point. As mentioned above, the thicker line represents the power spectrum before occurrence of the break with the ASE peak quite clearly around 1532 nm and a signal channel peak around 1552 nm. The thinner line represents the spectrum after repair of the ring and attempted restoration of the operating conditions of the ring not in accordance with the invention.

It is clear from the figure that correct working conditions are not restored automatically. In particular, the ASE peak after restoration is considerably lower than before the break and is not adequate for stabilizing the ring.

It must be noted that this can happen not only with a signal having a single channel, used here as an example to clarify the problem, but also for a signal having a larger number of channels.

It was found that it is possible to avoid this drawback by, after repair of the break or other fault has been detected, increasing the pump power or/and the output power of the first amplifier after the break or fault point in accordance with a ramp function. This ramp increase in pump power and/or output power is found sufficient, even in cases of poor starting power conditions, for starting the progressive and safe increase of the pump power of all the other amplifiers following in the ring until restoration of the operating conditions of the ring.

Although the slope of the ramp function may be chosen with great freedom, a ramp function that is too steep can cause the onset of undesirable transients. On the contrary, a ramp that is too shallow can make the restoration time excessively long. It is therefore advantageous that the ramp slope be chosen as a compromise to be slow enough to avoid those transients considered unacceptable for the specific requirements of the ring network, but at the same time fast enough to allow correct restoration of the ring in, ideally, the shortest possible time, but, in any case, an acceptable time.

Simulations and tests have ascertaining that a preferable choice for the ramp slope can be between 1.2 and 0.08 dB/ms and, in particular, between 1 dB/ms and 0.1 dB/ms.

Figure 3:
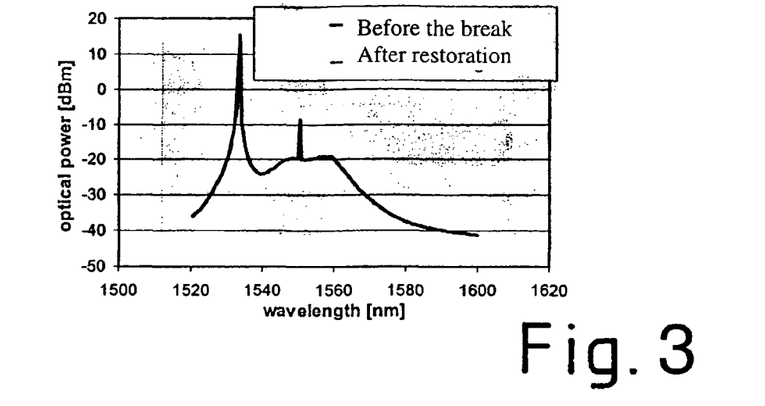
FIG. 3 shows a graph similar to that of FIG. 2 but for a network in accordance with the invention.

FIG. 3 shows the optical power spectrum at the amplifier output preceding the break point before and after a break when the operating conditions of the network are restored in accordance with the invention. As is the case in FIG. 2, the power spectrum is for a signal having a single channel. In this case, restoration of the operating conditions of the network was carried out by applying a ramp increase of 0.7 dB/ms of the pump power of the first amplifier after the break point.

It is noted that in this case, the laser peak at 1532 nm reaches the correct power level after repair and the graphs of the spectrum before the moment of break (thick line) and after restoration (thin line) substantially coincide.

The power increase may not have a perfectly rectilinear ramp shape but may have small divergences from the ideal ramp function. In particular, the pump power and/or output power may be increased and/or decreased gradually to begin with and at the end, thus realizing a curved ramp increase in pump power with a smooth transition between states.

Figure 4:
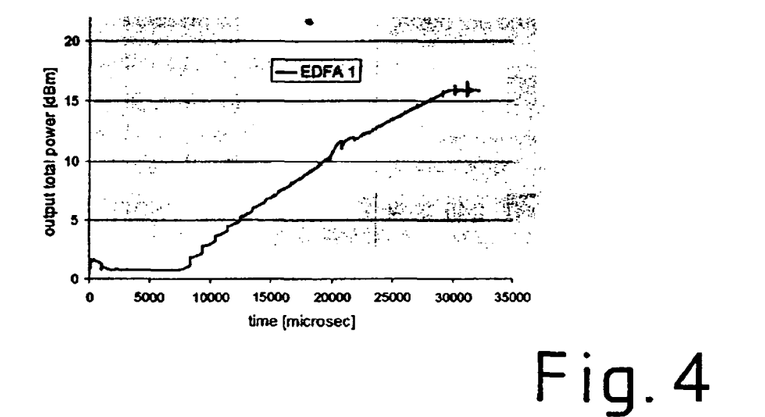
FIGS. 4 and 5 show respectively increases in the total power and total channel power at the output of an amplifier after repair of the break in the network in accordance with the invention.
Figure 5:
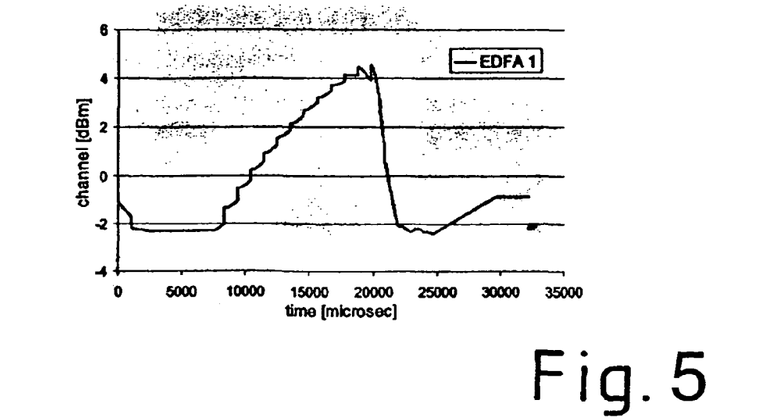

FIG. 4 shows the temporal behaviour of the total power and FIG. 5 shows the temporal behaviour of the channel power, both measured at the output of the amplifier immediately after the break point, the break having been repaired at t=0.

The absence of unacceptable power transients is clear. The total power presents a linear increase because of the softened ramp increase in pump power and the channel has a maximum range of 5 dB with reference to the nominal figure, which is a reasonable figure and which, in any case, represents the extreme case of only a single channel circulating in the network.

For the purpose of applying the method illustrated above, the control circuitry of the amplifier immediately following the break or fault point in the ring must be able to detect repair of the break or other fault and automatically start the ramp increase in the pump power and/or output power of the amplifier on repair. For this purpose, a monitor for measuring peak ASE power and/or a monitor for measuring total power of the signal is used. The use of a peak ASE power monitor facilitates detection of a break and repair of the break. Indeed, at the input of the first amplifier after the break point, peak ASE power is zero during the break and equal to the ASE level accumulated on the chain of amplifiers as soon as the ring is closed again (repaired). Thus when the ASE peak monitor passes from detection of a zero level to a finite power level it means that the ring has been repaired.

In addition to detecting the appearance of the restored condition, the power monitors at the input also allows detection of the appearance of a break condition or a low power condition at the input. This allows directing changeover from the constant power condition to the constant gain condition when the ring breaks or other fault occurs.

Considering that in the steady state and closed ring condition the ASE peak power level always has a high enough level, detection of the closed (and open) again conditions with a threshold detection circuit is very simple. The use of threshold detection ensures better identification of repair without false detections caused by noise.

Figure 6:
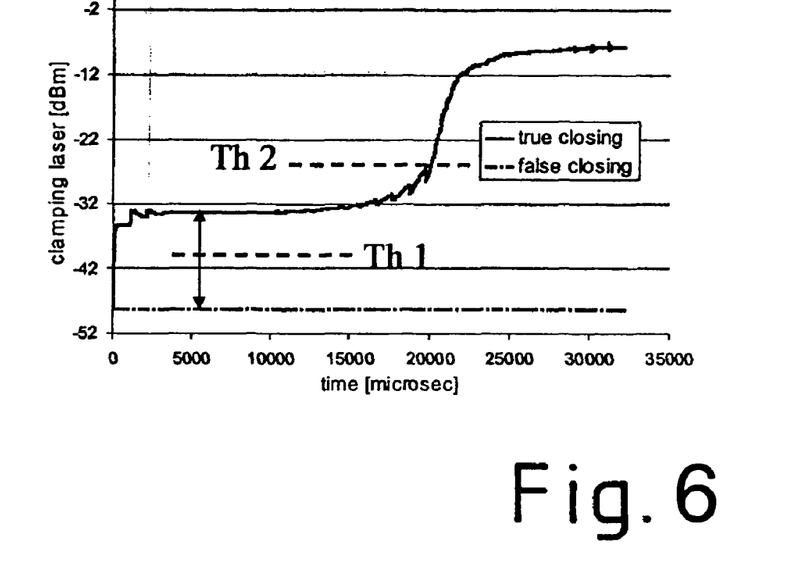
FIG. 6 shows a diagram of an example of the temporal trend of the clamping laser power measured at 1532 nm at the input of the amplifier with a pump increase in accordance with this invention.

During repair of a break or fault, the ring may temporarily be closed before being reopened again. This may occur as a result of tests or unsuccessful attempts at repair. FIG. 6 shows the temporal behaviour of the signal at the input of the amplifier to which is applied the ramp increase of pump power in accordance with this invention.

The dot and dash line represents the noise level measured in the absence of recirculating ASE power. Upon repair of the break (moment t=0) the ASE level is around −30 dBm which is well above the noise level. Therefore, with a suitable threshold (TH1) the repair can be adequately detected.

Another threshold (TH2) could be used to verify the rise of the ASE peak that follows the ramp increase in pump power. The same thresholds or different thresholds can be used to evaluate the appearance of the break condition, or even a partial break, of the ring.

After detection of the repair by the detection means at the input of the amplifier, it is possible to activate the ramp increase in pump power and/or output power to restore the operating conditions of the network. In accordance with one aspect of this invention, there are various possibilities in the pump activation mode.

According to a first possibility of simplified realization of this invention, upon detection of the reconnection, a ramp is immediately generated on the amplifier output power. This solution is simple but can cause false departures of the ramp due to temporary repair and reopening of the ring.

False starts can be quite detrimental because, depending on the balance of real power levels, generation of the ramp in an open ring state could constitute a risk for the channels still active in the ring. However, if this risk is considered low or acceptable, the solution of starting the ramp immediately upon detection of a repair is suitable.

In the contrary case, a second solution can be advantageously used. Said second solution calls for the use of a delay timer that is started upon detection of the repair. The verifies whether the ASE power remains above the threshold during operation of the timer in order to verify whether in the delay period, appropriately preset, the closed (repaired) condition persists. When the time set on the timer lapses, if the closed condition persisted throughout the delay period, the ramp increase in the pump or outlet power is activated.

This avoids false starts due to a temporary restoration followed immediately by a new break or other fault. The delay time must be adequately chosen to not be too long so as to avoid excessive delay in the restoration but short enough to filter the new break/fault events that might follow a brief restoration attempt.

To avoid an undesired delay in the starting of the ramp it is also possible to use a third solution that calls for starting immediately a short ramp (for example increasing the output power by only 2 dBm) and then activating a timer adequately set for verifying whether the closing conditions persist for the preset delay period. At the end of the delay period, if the closed conditions are still present, the ramp increase in power is continued until the expected maximum power. If the closed conditions are no longer present after the delay period, the temporary closing of the ring is considered a false restoration and the amplifier output power is returned to the preceding low power figure.

Thus, a good compromise is obtained between restoring the operating conditions of the network early and preventing undesirable effects on the channels of the signal if the repair is only temporary.

An example of the power levels of the signal after repair of a break for a "true closing" and a "false closing" are illustrated in FIG. 6. As will be appreciated, during a "true closing" (i.e. when the closed condition is maintained for longer than the delay period), there is a ramp increase in the power of the signal. For the "false closing" (i.e. when the closed condition of the exists for a time period less than the delay period), the power of the signal remains at a low level.

Figure 7:
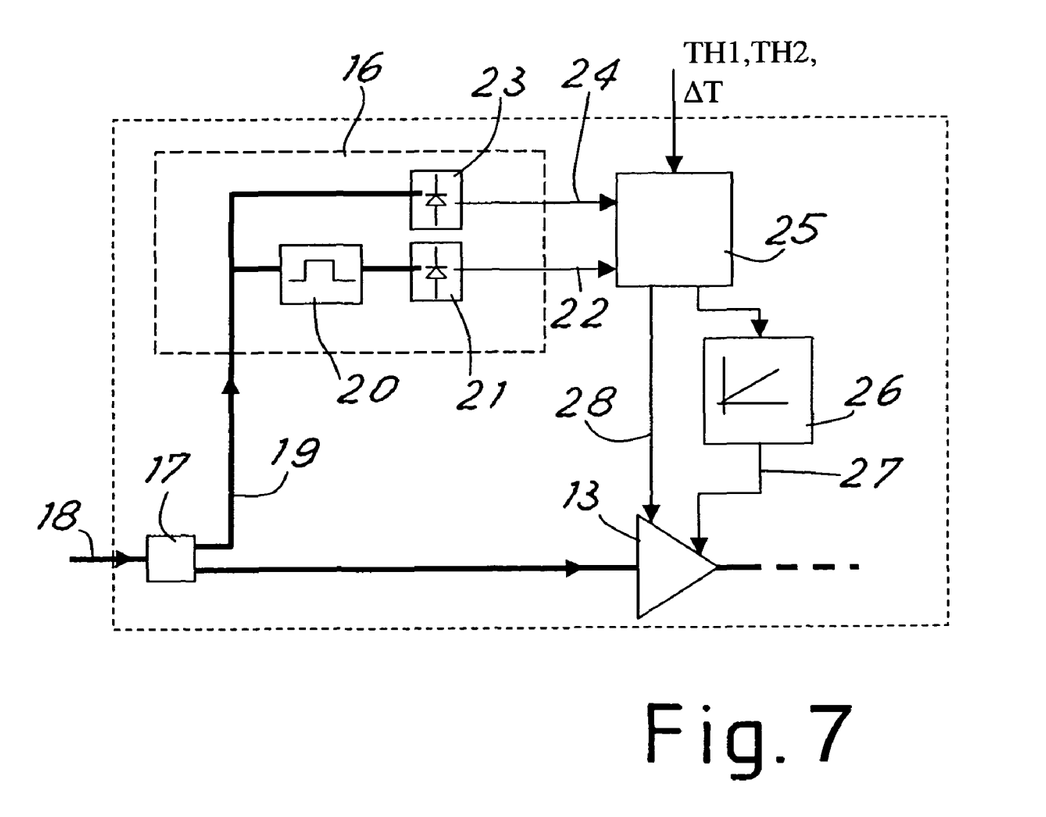
FIG. 7 illustrates diagrammatically a circuit for use in each of the amplification nodes of the network in accordance with the invention.

FIG. 7 shows a block diagram of the control circuitry of the amplifier of a node 12.

The circuit comprises a splitter 17 (for example with splitter ratio of 99/1) that takes a fraction 19 of the optical power at the input 18. The power at the input 18 arrives from the ring and is directed to the input of the EDFA amplifier 13. The structure of the amplifier with its known accessorial circuits and possibly the ADD/DROP circuits of the node are well known to those skilled in the art and not further described or shown here.

The fraction 19 taken is sent to a section or means 16 of detection or monitoring of breaking of the ring. The section 16 emits electrical signals in response to the detected power level of the ASE lasing peak of the input signal.

In the realization described, said ASE peak monitor comprises an appropriate pass-band optical filter 20 centred around the wavelength of the ASE peak to let only the ASE noise wavelengths pass. The filtered signal is sent to a known photodiode detector 21 that produces an electrical signal output 22 as a function of the ASE peak power. Depending on the optical filter used for monitoring the ASE peak power, one can have a variation of the detection threshold.

For the purposes mentioned above, as an alternative or in addition to the ASE peak detector, there can also be provided a total power monitor realized in particular with a known photodiode detector 23 that produces an electrical signal output 24 which is a function of the total optical power input.

Monitoring the total power input also provides another alternative for detecting the ring break. In normal operation, the gain and the total output of the optical amplifiers are constant and therefore the total input power in a recirculation ring is constant. A ring break causes reduction in the total input power because of the loss of the lasing signal. A fibre break can thus be declared when the input power falls below the constant figure within a specified time interval. This method gives less security as regards false break-detections because it does not distinguish between loss of recirculation and a transitory loss in the fibre generated, for example, by micro bending of the fibres.

Just to have greater safety, it would be preferable to monitor both the ASE peak emission and the total input power. In this way, the output of both the monitors can be correlated, the control circuitry reacting as required for a ring break only when both the ASE peak emission and the total power are reduced in a manner considered significant. In other words, if both the signals are reduced below respective preset thresholds, the control circuitry assumes a ring break has occurred. Furthermore, the restoration of the closed ring conditions can be more accurately identified.

Signals 22 and 24 are sent to a logical control section 25 for event handling. The logic 25 can thus direct the amplifier 13 depending on detected conditions of break or restoration of the ring.

After a ring break, upon detection of restoration of the ring this logic 25 causes activation of the ramp increase in power to go into effect in accordance with predetermined rules on the EDFA pump power or on the EDFA output power. These rules include appropriate thresholds TH1, TH2 and a predetermined total or partial delay ΔT. Generation of the ramp is entrusted to a ramp generator 26 that sends the appropriate ramp signal 27 to control the output power or of the pump power of the EDFA 13.

As described above, the logic 25 can also provide another appropriate signal 28 to command the output power or the pump power of the EDFA to pass from the constant power condition to the constant gain condition when a ring break or other fault is detected. If necessary, a feedback system (not shown) monitoring the amplifier output power can be provided for this control.

All of the control logic, including the ramp generator, can be readily implemented by means of a CPLD/FPGA device as imaginable to those skilled in the art.

As mentioned above, when loss of the ASE peak is detected, the optical amplifiers switch into a gain control mode. If constant output power was maintained, the channels power levels would be increased suddenly (within a few tens of microseconds) to levels that would be too high because of loss of the lasing light signal and the fact that the amplifiers are still in saturation.

However, with gain control the optical amplifiers are driven to keep approximately the optical gain that was provided by the amplifier before loss of the ASE peak. Switching to gain control reduces the pump power because of loss of the lasing peak. After a short but predetermined period of time, for example one second, the real output power obtained can be read and operation of the optical amplifiers can be again switched into power control operation with this new level of output power.

To obtain changeover from power control to gain control and possibly gain to power control, the input and output optical power can be monitored and the pump power, of the optical amplifier can be adjusted when necessary.

This can be done with a feedback type control, a feedforward type of control using the measured input power or a combination of both. If the optical amplifier is in a constant output power mode, it is necessary to monitor only the input power since the output power is known and fixed.

One advantage of the system is that it can still manage the addition or removal of a channel even when the ring is broken. A certain reduction in stability could occur in a chain of optical amplifiers used in this manner because of the increase in power fluctuations. This electronically controlled operation is not steady in a closed ring configuration and therefore, is only suitable when the ring is broken.

However, it is not essential to return to power control when gain control adjustments have been established after loss of the lasing peak. As an alternative, gain control could be maintained. As another alternative, the optical amplifiers could be adjustable instead of holding constant the adjustments of the pumps once gain control regulations have been established. This makes the ring not very flexible until the failure is repaired but has greater stability.

The optical amplifier control circuitry could be used in any position in the respective node, for example in the channel ADD/DROP multiplexer.

It is now clear that the method, devices and network according to the invention facilitate the correct restoration of the operating conditions of a ring network after a break in a ring optical network.

However, it will be understood that the invention is not limited to the above-described embodiments but modifications and alterations can be made without departing from the scope of the invention defined in the claims.

For example, the filter and the peak detector could monitor, instead of the input power, the output power of the optical amplifier to detect the presence or absence of the amplified lasing peak.

As another alternative, the network could be arranged to adapt to a shifting ASE lasing peak. Indeed, if the section attenuation should change, the peak could move slowly and the power detected would be reduced, for example under the threshold. To oppose this action in case of slow shifting, the amplifier operation point could be changed to restore the measured ASE peak level.

Optical amplifiers different from EDFAs could also be used with possible adaptations of the ramp times.

The invention claimed is:

1. A method of restoring operating conditions in an optical network comprising a plurality of optical amplifiers after a fault in the optical network has occurred, the method comprising:

detecting that a fault in the optical network has been repaired by detecting, at an amplifier input, a reappearance or a rise of a lasing peak that exceeds a predetermined threshold and a reappearance or a rise in total power that exceeds a predetermined threshold; and responsive to detecting that the fault has been repaired, increasing one or both of an output power and a pump power of one or more of the plurality of optical amplifiers such that the power increase corresponds substantially with a ramp function.

2. The method of claim 1 wherein a slope of the ramp function is less than about 1.2 dB/ms.

3. The method of claim 2 wherein the slope of the ramp function is between about 1.2 and 0.08 dB/ms.

4. The method of claim 3 wherein the slope of the ramp function is between about 1 dB/ms and 0.1 dB/ms.

5. The method of claim 3 wherein the slope of the ramp function is about 0.7 dB/ms.

6. The method of claim 1 wherein increasing one or both of an output power and a pump power of one or more of the plurality of optical amplifiers is performed immediately responsive to detecting the repair of the fault.

7. The method of claim 1 wherein increasing one or both of an output power and a pump power of one or more of the plurality of optical amplifiers is performed responsive to detecting that the fault in the optical network has been repaired for a predetermined time.

8. The method of claim 1 wherein increasing one or both of an output power and a pump power of one or more of the plurality of optical amplifiers is performed in stages comprising:

in a first stage, partially increasing one or both of the output power and the pump power upon detecting the repair; and in a second stage, further increasing one or both of the output power and the pump power responsive to detecting that the fault in the optical network has been repaired for a predetermined time.

9. The method of claim 8 further comprising canceling the first stage responsive to detecting that the fault in the optical network has not been repaired for the predetermined time.

10. A method of restoring operating conditions in an optical network comprising a plurality of optical amplifiers after a fault in the optical network has occurred, the method comprising:

detecting that a fault in the optical network has been repaired; and responsive to detecting that the fault has been repaired, increasing one or both of an output power and a pump power of one or more of the plurality of optical amplifiers such that the power increase corresponds substantially with a ramp function;

switching the plurality of optical amplifiers from a first operating mode to a different second operating mode responsive to detecting that the fault has been repaired; and wherein the plurality of optical amplifiers generate a substantially constant gain in the first operating mode, and a substantially constant output power in the second operating mode.

11. The method of claim 10 wherein increasing one or both of an output power and a pump power of one or more of the plurality of optical amplifiers is performed responsive to detecting, at an amplifier input, a reappearance or a rise of a lasing peak that exceeds a predetermined threshold and a reappearance or a rise in total power that exceeds a predetermined threshold.

12. An optical ring network comprising:

a plurality of optical amplifiers communicatively linked by one or more optical fibers in a ring;

a monitor configured to detect a fault in the ring, and to determine that the fault has been repaired_by detecting, at an amplifier input, a reappearance or a rise of a lasing peak that exceeds a predetermined threshold and a reappearance or a rise in total power that exceeds a predetermined threshold; and a controller configured to control one or both of an output power and a pump power of at least one of the plurality of amplifiers to increase substantially according to a selected ramp function responsive to detecting that the fault detected by the monitor has been repaired.

13. The network of claim 12 wherein the monitor comprises:

a splitter configured to divert a fraction of one of the input power or output power of each amplifier; and a detector configured to measure the input or output power.

14. The network of claim 13 wherein the monitor further comprises:

a filter configured to pass only an ASE noise; and a first detector configured to detect a presence or absence of the lasing peak.

15. The network of claim 14 further comprising a second detector configured to detect a variation in a total input power.

16. The network of claim 12 wherein a slope of the ramp function is less than 1.2 dB/ms.

17. The network of claim 16 wherein the slope of the ramp function is between about 1.2 and 0.08 dB/ms.

18. The network of claim 17 wherein the slope of the ramp function is between about 1 dB/ms and 0.1 dB/ms.

19. The network of claim 18 wherein the slope of the ramp function is about 0.7 dB/ms.

20. The network of claim 12 wherein the controller comprises a timer configured to direct the increase in one or both of the output power and pump power only if the fault has been repaired for a predetermined time.

21. The network of claim 20 wherein the timer is configured to direct the increase in stages, wherein:

in the first stage, one or both of the output power and the pump power is partially increased as soon as the monitor detects that the fault has been repaired; and in the second stage, one or both of the output power and the pump power is further increased only if the fault has been repaired for a predetermined time.

22. The network of claim 12 wherein the control section switches an operating mode of the optical amplifiers from a first operating mode to a different second operating mode responsive to detecting the fault.

23. The network of claim 22 wherein the plurality of optical amplifiers generate a substantially constant output power in the first operating mode, and a substantially constant gain in the second operating mode.

24. The network of claim 12 wherein the monitor comprises a preset intervention threshold.

25. A controller for controlling an amplifier of an optical ring network, the controller comprising:
  a monitor configured to detect the presence of absence of a fault in the optical ring network by detecting, at an amplifier input, a reappearance or a rise of a lasing peak that exceeds a predetermined threshold and a reappearance or a rise in total power that exceeds a predetermined threshold; and
  a controller configured to control one or both of an output power and a pump power of the amplifier to increase substantially according to a selected ramp function responsive to the monitor detecting the absence of a previously detected fault.

* * * * *

UNITED STATES PATENT AND TRADEMARK OFFICE
CERTIFICATE OF CORRECTION

PATENT NO. : 8,036,526 B2  
APPLICATION NO. : 11/915567  
DATED : October 11, 2011  
INVENTOR(S) : Bogoni et al.

Page 1 of 1

It is certified that error appears in the above-identified patent and that said Letters Patent is hereby corrected as shown below:

In Column 3, Line 59, delete "ring, The" and insert -- ring, the --, therefor.

In Column 11, Line 9, in Claim 25, delete "presence of" and insert -- presence or --, therefor.

Signed and Sealed this  
Seventeenth Day of April, 2012

David J. Kappos  
*Director of the United States Patent and Trademark Office*